United States Patent
Cobb

(10) Patent No.: US 7,851,545 B2
(45) Date of Patent: Dec. 14, 2010

(54) PAINT COMPOSITION

(75) Inventor: James Campbell Cobb, Julatten (AU)

(73) Assignee: Chroma Australia Pty Limited, Mt. Kuring-gai, New South Wales (AU)

( * ) Notice: Subject to any disclaimer, the term of this patent is extended or adjusted under 35 U.S.C. 154(b) by 0 days.

(21) Appl. No.: 11/995,516

(22) PCT Filed: Jul. 14, 2006

(86) PCT No.: PCT/AU2006/000989

§ 371 (c)(1), (2), (4) Date: Jan. 11, 2008

(87) PCT Pub. No.: WO2007/009161

PCT Pub. Date: Jan. 25, 2007

(65) Prior Publication Data

US 2008/0194745 A1 Aug. 14, 2008

(30) Foreign Application Priority Data

Jul. 15, 2005 (AU) ............... 2005903740

(51) Int. Cl.
*C08F 220/10* (2006.01)
*C08K 5/17* (2006.01)
(52) U.S. Cl. .................. 524/560; 524/186
(58) Field of Classification Search .......... 524/560, 524/186
See application file for complete search history.

(56) References Cited

U.S. PATENT DOCUMENTS

| | | | |
|---|---|---|---|
| 3,374,196 A | 3/1968 | Gills et al. | |
| 4,139,514 A * | 2/1979 | Bassett | 524/824 |
| 4,190,693 A * | 2/1980 | Martorano et al. | 428/209 |
| 4,243,430 A | 1/1981 | Sperry et al. | |
| 4,954,556 A | 9/1990 | Bull et al. | |
| 5,192,592 A * | 3/1993 | Shay | 427/358 |
| 5,276,075 A | 1/1994 | Santini | |
| 5,288,160 A | 2/1994 | Li et al. | |
| 5,658,499 A | 8/1997 | Steinberg et al. | |
| 5,877,241 A | 3/1999 | Giles, Jr. et al. | |
| 6,025,449 A * | 2/2000 | Enomoto et al. | 526/320 |
| 6,090,449 A | 7/2000 | Ferdinando et al. | |
| 6,162,869 A | 12/2000 | Sharma et al. | |
| 6,303,189 B1 | 10/2001 | Gray et al. | |
| 2003/0059599 A1 | 3/2003 | Beckley et al. | |
| 2003/0144465 A1 | 7/2003 | Leenders et al. | |
| 2003/0191236 A1* | 10/2003 | Buckmann et al. | 524/591 |
| 2005/0020744 A1 | 1/2005 | Cabrera et al. | |

FOREIGN PATENT DOCUMENTS

| | | |
|---|---|---|
| JP | 53-154990 | 6/1980 |
| WO | WO9733757 A1 | 9/1997 |
| WO | WO0190263 A3 | 11/2001 |

OTHER PUBLICATIONS http://www.rohmhaas.com/assets/attachments/business/architectural_and_functional_coatings/acrysol_ase/acrysol—ase-60/tds/acrysol_ase-60.pdf, Aug. 2003, Datasheet.*
Ciba Specialty Chemicals, Specialty Resins Information Brochure, Jun. 20, 2002.

* cited by examiner

*Primary Examiner*—Satya B Sastri
(74) *Attorney, Agent, or Firm*—Clayton, Howarth & Cannon, P.C.

(57) ABSTRACT

There is described a water-based paint composition comprising least one pigment; at least one alkali soluble polymer in an amount effective to increase the open time of the composition; at least one substituted amine in an amount effective to adjust the pH to about 7 to about 11: a binding effective amount of at least one water dispersible acrylic polymer; and an effective amount of at least one alkali soluble or alkali swellable thickener. A method of extending the open time of a water-based acrylic paint composition and a method of controlling the open time of a water-based acrylic paint composition are also described.

30 Claims, No Drawings

PAINT COMPOSITION

CROSS-REFERENCE TO RELATED APPLICATIONS

This application is the U.S. National Stage of International Application No. PCT/AU2006/000989, filed Jul. 14, 2006, which claims priority to Australian Provisional Application No. 2005903740, filed Jul. 15, 2005, both of which are hereby incorporated by reference in their entireties.

STATEMENT REGARDING FEDERALLY SPONSORED RESEARCH OR DEVELOPMENT

Not applicable

FIELD OF THE INVENTION

This invention relates to water based artists' paints and more particularly to improved water based artists' paint compositions.

BACKGROUND TO THE INVENTION

Acrylic paints dry as water leaves the paint. As water evaporates or is absorbed by the substrate to which the paint is applied, acrylic polymer particles coalesce into a continuous adhesive film. Within a relatively short period of time, approximately 10 to 15 minutes, a skin forms over the outer surface of the paint film. At this stage the paint film is said to be "dry to the touch". The thicker films continue to dry over time, the length of time varying with the thickness of the film. For very thin films this may be a few minutes, while films half a centimeter in thickness or more may take weeks or months.

Once the skin has formed over the paint film, the film can no longer be worked. The artist is not able to change and adapt what is taking place on the canvas using traditional techniques. Although the touch dry film could be painted over, the "wet in wet" painting techniques are severely curtailed. The term "wet in wet" is used by persons skilled in the art to refer to painting techniques by which the artist creatively works and develops the wet paint on the substrate, adding, blending and altering the appearance over time to achieve the desired artistic result.

Temperature, humidity and air flow are environmental factors that influence the drying times of acrylic paint compositions. The time taken for a paint film to skin over can be extended somewhat by reducing air-flow, lowering temperature and increasing humidity. Manipulating such environmental factors may not always be possible or practical. Low temperatures (below about 9° C.) may interfere with coalescence of the polymer particles resulting in paint film cracking, becoming powdery or failing to adhere to the substrate. Optimum humidity may be difficult to determine and maintain.

The nature of the substrate also influences the drying time of acrylic paint compositions. An absorbent substrate will draw moisture out of the paint composition and speed drying time. Sealing the substrate to reduce absorbency or selecting a nonabsorbent substrate such as metal or masonite will reduce the moisture lost through the substrate. Using a moist substrate can also reduce moisture lost through the substrate and increase humidity in the environment of the paint. By soaking the back of a canvas with water or attaching wet rags or sponges to the back of a canvas, for example, the rate of drying of the paint film can be reduced. This technique has limitations and the water may also wash impurities out of the canvas into the paint film causing discoloration.

Humectants, such as glycerin or propylene glycol may be used as paint additives to extend the time taken for a paint film to skin over. As paint additives however, humectants tend to linger in the paint film. They can remain tacky and adversely affect outer coat adhesion. Most importantly they do not prevent fast drying of thin films of paint.

DISCLOSURE OF THE INVENTION

The invention relates to a water-based paint containing at least one water dispersible acrylic polymer, the improvement comprising including in the composition at least one alkali soluble polymer in an amount effective to increase the open time of the composition and at least one substituted amine in an amount effective to adjust the pH to about 7 to about 11.

In one aspect the present invention provides a water-based paint composition comprising: at least one pigment in an effective amount to provide the desired pigmentation; at least one alkali soluble polymer in an amount effective to increase the open time of the composition, said polymer being selected from the group consisting of polymers soluble at ambient temperature and pressure in an aqueous solution having a pH of from about 7 to about 11; at least one substituted amine in an amount effective to adjust the pH to about 7 to about 11, said amine selected from the group consisting of $C_{1-6}$ alcohol amines, $C_{1-6}$ alkyl $C_{1-6}$ alcohol amines and mixtures thereof; a binding effective amount of at least one water dispersible acrylic polymer; and an effective amount of at least one alkali soluble or alkali swellable thickener.

The composition also optionally includes one or more conventional additives such as dispersants, rheology modifiers, defoamers, coalescents and preservatives.

The term "open time" as used herein means the time during which the paint composition remains workable such that it may be blended and altered.

The present inventor has surprisingly found that the period during which a water-based acrylic paint composition remains workable, i.e. the open time of the paint, can be significantly extended to free the artist to develop the artistic work over many hours. Rather than developing a paint skin in the normal way, within about 10 minutes, the composition sets gradually over time. Wet paint may therefore be applied over paint already on a substrate and may be blended with it and into it, giving artists time to create complex paintings while working at their own pace and with ample opportunity to revise and alter their work before it becomes fixed. The open time can be extended for several hours and for as long as a day by using the composition of the invention and by periodically applying water to the paint film for example by sprinkling or spraying. The conventional acrylic binder, namely a water dispersible polymer, is prevented from forming a skin as the water evaporates. Whilst not wishing to be bound by theory, it is believed that the alkali soluble polymer forms a coating around the dispersion polymer particles preventing coalescence of those particles. A water resistant film is formed only when the amine evaporates and the alkali soluble polymers themselves become water resistant.

Accordingly, the present invention also provides a method of extending the open time of a water-based acrylic paint composition comprising including in the composition at least one alkali soluble polymer in an amount of effective to increase the open time of the composition said polymer being selected from the group consisting of polymers soluble at ambient temperature and pressure in an aqueous solution having a pH of from about 7 to about 11; and at least one substituted amine in an amount effective to adjust the pH to about 7 to about 11 and optionally, periodically applying water to the composition.

Alkali Soluble Polymer

As used herein, the term "alkali soluble polymer" means a polymer which is capable of being solubilized at ambient temperature and pressure in an aqueous solution where the pH is alkaline. The solubilization pH of the alkali-soluble polymer is generally in the order of from about 7 to about 11. Preferably the solubilisation pH is in the order of from about 7.5 to about 10, more preferably about 7.5 to about 9.5. An alkali soluble polymer has at least one acidic or anion producing group. Examples of anion producing groups include but are not limited to carboxylic hydroxyl, phenolic hydroxyl, active imido and sulfonamide.

The alkali soluble polymer is made to serve as an auxiliary binder and is not a conventional ingredient in acrylic paints.

The proportion of alkali soluble polymer can be varied to manipulate the drying time of the paint composition. The higher the ratio of alkali soluble polymer to water dispersible acrylic polymer, the longer the drying time as long as a slow-evaporating amine is also present (as discussed below).

For a paint composition with a feel similar to a conventional acrylic artists' paint the ratio of alkali soluble polymer to water dispersible acrylic polymer may range from about 1:4 to 1:20, preferably from about 1:5 to 1:10. In a 200 L batch of paint for example where 80 kg/200 L of water dispersible acrylic binder is used and about 10 kg/200 L of alkali soluble or alkali swellable thickener, the amount of alkali soluble polymer may be in the range of about 4-20 kg/200 L, preferably 8-15 kg/200 L, more preferably 8-12 kg/200 L and most preferably 8-10 kg/200 L. This equates to ratios of alkali soluble polymer to water dispersible acrylic polymer of from about 1:4 to 1:20, preferably from about 1:5.33 to 1:10, more preferably from about 1:6.66 to 1:10 and most preferably from about 1:8 to 1:10.

For a paint composition with a feel more like a traditional gouache a ratio of alkali soluble polymer to water dispersible acrylic polymer may range from about 1:1 to 1:3, preferably about 3:4. This ratio gives a tough paint film which is less brittle and more flexibile than a conventional guache but can still be applied thickly if desired.

Artists may wish to use paints in several different ways or techniques in the same painting and the paint is usually applied in successive layers. An artist may sometimes want a layer of paint to dry quickly, but more often wants to extend the open time, and being able to control what is happening is desirable.

A paint as described above with 80 kg water dispersible acrylic binder per 200 L and 8-12 kg of alkali soluble binder does not form a skin and can be kept "open" by spraying with a water atomiser from time to time as water evaporates and the paint becomes tacky. Mediums can also be used to give the artists even more control.

For faster drying, a medium made from water dispersible acrylic polymer applied to a paint film will swing the balance towards fast film formation, while for a slower drying paint, a medium made from alkali soluble polymer/substituted amine swings the balance in the opposite direction.

In a preferred embodiment therefore, the invention provides a method of controlling the open time of a water-based acrylic paint composition, the method comprising including in the composition at least one alkali soluble polymer in an amount effective to increase the open time of the composition and at least one substituted amine in an amount effective to adjust the pH to about 7-11 and periodically applying to the composition one or more of:

(a) water;
(b) a medium comprising at least one alkali soluble polymer and at least one substituted amine in an amount effective to adjust the pH to about 7-11; and
(c) a medium comprising at least one water dispersible acrylic polymer.

Suitable commercially available alkali soluble polymers are flexographic ink polymers such as those manufactured by Rohm & Haas under the names Lucidene™ 361 and Lucidene™ 602 LS, and ACRYSOL I-62. Also suitable are Glascol™ LS16, and the LE 500 series—LE 51—, LE 520 and LE 530 manufactured by Ciba Specialty Chemicals and JONCRYL 142™ manufactured by Johnson Wax Co.

Substituted Amine

Substituted amines are included in amounts sufficient to neutralise the composition to a pH in the range of about 7 to about 11. Preferably the pH is in the range of from about 7.5 to 10, more preferably about 7.5 to 9.5. Suitable amines include $C_{1-6}$ alcohol amines and $C_{1-6}$ allyl $C_{1-6}$ alcohol amines such as aminomethylpropanol (AMP), monoethanolamine (MEA), diethanolamine (DEA) and triethanolamine (TEA) and mixtures thereof. AMP and TEA and mixtures thereof are preferred. Substituted amines are selected so as to stow the evaporation of the amines thereby extending the time in which the binders and thickeners (those which are water soluble or swellable under alkali conditions) may remain in solution.

Dispersible Acrylic Polymer

The present invention includes at least one water dispersible acrylic polymer. These polymers are conventional binders for acrylic paints, well known to those skilled in the art. Suitable polymers include water dispersible polymers containing one or more monomers selected from styrene, acrylates, alkylarylates and dienes. Polymers including acrylate, methacrylate and methyl methacrylate monomers are common.

The selection of water dipersible acrylic binder and the quantity to be used for the composition of the present invention is within the skill of the person skilled in the art using routine trial and experimentation.

Examples of suitable commercially available water dispersible acrylic polymers are PR 3230, ac 2235, ACI-1955 and PRIMAL SF-017 manufactured by Rohm & Haas. Also suitable is ACRONAL 290D manufactured by BASF.

The water dispersible acrylic polymer is present in the composition of the invention in a binding effective amount A "binding effective amount" of at least one water dispersible acrylic polymer will be understood to mean that the at least one water dispersible polymer is present in an amount so that in combination with the at least one alkali polymer discussed above, it will bind the pigment particles together into a cohesive paint film upon drying.

Thickener

One or more alkali soluble or alkali swellable thickeners are included in the composition of the present invention. Such thickeners typically comprise the aqueous emulsion reaction product of an unsaturated carboxylic acid monomer, e.g., methacrylic acid; a monoethylenically unsaturated monomer different from the carboxylic acid monomer, e.g. ethyl acrylate; a macromonomer comprising a hydrophobic portion and an alkoxylated portion which is polymerizable with the other monomers; and a monomer having latent crosslinking functionality. Suitable thickeners include UCAR 146 and UCAR POLYPHOBE TR115, manufactured by Union Carbide and ACRYSOL DR-1, ACRYSOL DR-73, ACRYSOL ASE 60 manufactured by Rohm & Haas.

The thickeners may be varied depending on the main pigments being used in order to get a uniform viscosity. The selection of alkali soluble or alkali swellable thickener and the quantity to be used for the composition of the present invention is within the skill of the person skilled in the art using routine trial and experimentation.

Pigment

One or more pigments may be included in the composition. Pigmentation provides colour and opacity and may contribute to other properties of the paint composition. A person skilled in the art will be aware that pigment particle size and shape, ease of wettability or properties relating to specific density contribute to the viscosity and application characteristics of the wet paint composition and ultimately properties of the dried paint coatings. A person skilled in the art will therefore appreciate that the choice of pigment will have an effect on the choice of other ingredients such as thickeners.

It is well within the skill of the addressee to determine the appropriate selection of pigment and the quantity to be used using routine trial and experimentation.

Colour pigments may be organic or inorganic compounds, natural or synthetic and these may be used separately or in combination. Titanium dioxide is a common white pigment with a high refractive index and excellent hiding power (the ability to render a paint opaque). It is frequently used with both coloured organic and inorganic pigments. Iron oxides range in colour from yellow and red to brown and black. Azo pigments are a common class of organic colour pigments. Pigments called "extender" pigments may be used in conjunction with other pigments. The use of extender pigments reduces shrinkage stresses within the paint film and increases the pigment volume content at relatively low cost. Extender pigments include those based on carbonates, silicates, sulfates, barytes and mica. The use of extender pigments aids in viscosity and flow control and reinforces the dry film strength.

Dispersant

The composition of the present invention may include one or more dispersants. These are conventional ingredients used to enhance pigment loading and dispersion stability. The dispersant may be nonionic or anionic surfactants. Anionic surfactants are preferred. Examples of suitable anionic emulsifiers include sodium lauryl sulfate, sodium dodecyl benzene sulfonate, dioctylsulfosuccinate, sodium polyoxyethylene lauryl ether sulfate, sodium dodecyl diphenyloxide disulfonate and other diphenylsulfonate derivatives, and sodium salt of tert-octylphenoxyethoxypoly(39) ethoxyethyl sulfate.

Suitable anionic surfactants are manufactured by Rohm & Haas under the trade marks OROTAN 1124, OROTAN 1288, OROTAN 731 DP and OROTAN 850.

The skilled addressee is able to determine the appropriate selection of dispersants and the quantity to be used using routine trial and experimentation.

Other Additives

The composition also optionally includes one or more conventional additives such as rheology modifiers, defoamers, coalescents and preservatives.

BEST MODES FOR PERFORMING THE INVENTION

The invention will now be further discussed with reference to the following examples. It is to be understood that these examples are illustrative and not restrictive.

EXAMPLE 1

| Ingredient | Function | Quantity (kg) |
|---|---|---|
| Quinacridone Magenta | Pigment | 20 kg |
| Orotan 1124 (Rohm & Haas) Functionalised polyacrylate copolymer (Anionic Dispersant) | Dispersant | 4 kg |
| Surfynol CT-171 (Air Products & Chemicals Inc) Anionic Dispersant | Dispersant | 4 kg |
| Acrysol I 62 (Rohm & Haas) Alkali Soluble Ink Polymer | Auxiliary Binder | 8 kg |
| Calcium Carbonate | Extender | 50 kg |
| PR3230 (Rohm & Haas) Acrylic Dispersion | Binder | 80 kg |
| Propylene Glycol | Freeze/thaw stability | 6 kg |
| TT615 (Rohm & Haas) Alkali Swellable Rheology Modifier | Rheology Modifier | 2 kg |
| Acrysol DR1 (Rohm & Haas) Alkali Swellable Rheology Modifier | Rheology Modifier | 2 kg |
| Acrysol ASE 60 (Rohm & Haas) Acrylic polymer containing carboxylic acid groups (Alkali Swellable Thickener) | Thickener | 8-10 kg |
| AMP or MEA to pH 9.3 | Neutraliser | |
| Water | | q.s. 200 L |

EXAMPLE 2

| Ingredient | Function | Quantity (kg) |
|---|---|---|
| Perinone Orange | Pigment Remainder as for Example 1 except no Quinacridone Magenta pigment | 10 kg |

EXAMPLE 3

| 3. Terre Verte | Pthalo Blue Pigment: Raw Sienna Pigment: Remainder as for Example 1 except no Quinacridone Magenta pigment or calcium carbonate | 4 kg 68.25 kg |

EXAMPLE 4

| 4. Blue Black | Pthalo Blue | 10 kg |
| --- | --- | --- |
| | Carbon Black | 2.5 kg |
| | Remainder as per Example 1 except no Quinacridone Magenta pigment | |

EXAMPLE 5

| 5. Ultramarine Blue | Pigment | 100 kg |
| --- | --- | --- |
| | Remainder as for Example 1 except no Quinacridone Magenta pigment or calcium carbonate | |

The thickeners may be varied depending on the main pigments being used in order to get a uniform viscosity. The alkali swellable thickener in the examples may be substituted with other conventional alkali swellable thickeners as discussed above.

The amount of Alkali Soluble Ink polymer may be varied to control the rate of drying. For ACRYSOL I-62 in the examples above amounts may be varied from about 4 kg to about 20 kg/200 L. Preferred amounts are from 8-15 kg/200 L more preferably 8-12 kg/200 L. Less than 4 kg does not achieve the desired effect.

The paint making process is the same for any colour and is the conventional procedure which may be summarised as follows.

Stage 1: Load: Add water, dispersants, some defoamer as required to control against foam and alkali soluble ink polymer and under agitation using a cavitation mixer such as a TORRACE mixer, add enough substituted amine, such as MEA or TEA, to neutralize this mixture to desired pH, add the coalescent if used. A suitable defoamer is manufactured by Henkel under the trade mark FOAMASTER NS-1.

Stage 2: At this point the pigment (and extender if used) is added, either in powder form, or possibly as a pre-dispersed liquid which has already been processed in a bead mill.

Stage 3: Add a portion of the thickener and disperse.

Stage 4: Let down: Add the acrylic binder dispersion, the rheology modifiers and remainder of the thickener and the propylene glycol.

Stage 5: Add sufficient water to make 200 L and stir until the batch is uniform.

EXAMPLE 6

| Ingredient | Function | Quantity (kg) |
| --- | --- | --- |
| Quinacridone Magenta Pigment | Pigment | 20 kg |
| Calcium Carbonate | Extender | 50 kg |
| Orotan 1124 (Rohm & Haas) Functionalised polyacrylate copolymer (Anionic Dispersant) | Dispersant | 4 kg |
| Surfynol CT-171 (Air Products & Chemicals Inc),. Anionic Dispersant | Dispersant | 4 kg |
| AC 2235 (Rohm & Haas] Acrylic Dispersion | Binder | 80 kg |
| Texanol (Eastman Chemical Company) Ester alcohol | Coalescent | 2 kg |
| TT615 (Rohm & Haas) Alkali Swellable Rheology Modifier | Rheology Modifier | 1.5 kg |
| Acrysol ASE 60 (Rohm & Haas) Acrylic polymer containing carboxylic acid groups (Alkali Swellable Thickener) | Thickener | 10 kg |
| Acrysol DR72 (Rohm & Haas) Alkali Swellable Rheology Modifier | Rheology Modifier | 2 kg |
| Propylene Glycol | Freeze/thaw stabilizer | 4 kg |
| Joncryl 142 (Johnson Wax Co) Alkali Soluble Ink Polymer | Auxiliary Binder | 10 kg |
| AMP or MEA to pH 9.3 | Neutraliser | |
| Water | | q.s. 200 L |

EXAMPLE 7

| Ingredient | Function | Quantity (kg) |
| --- | --- | --- |
| Arylamide Yellow Pigment 2G X 70 | Pigment | 20 kg |
| Orotan 1124 (Rohm & Haas) Functionalised polyacrylate copolymer (Anionic Dispersant) | Dispersant | 4 kg |
| Surfynol CT-171 (Air Products & Chemicals Inc). Anionic Dispersant | Dispersant | 4 kg |

-continued

| Ingredient | Function | Quantity (kg) |
|---|---|---|
| AC I-1955 (Rohm & Haas) Alkali Soluble Acrylic Dispersion | Binder | 80 kg |
| Texanol (Eastman Chemical Co) Ester alcohol | Coalescent | 2 kg |
| TT615 (Rohm & Haas) Alkali Swellable Rheology Modifier | Rheology Modifier | 2 kg |
| Acrysol ASE 60 (Rohm & Haas) Acrylic polymer containing carboxylic acid groups (Alkali Swellable Thickener) | Thickener | 10 kg |
| Lucidene 361 (Rohm & Haas) water-based polystyrene/acrylic emulsion (Alkali Soluble Ink Polymer) | Auxiliary Binder | 10 kg |
| AMP or MEA to pH 9.3 | Neutraliser | |
| Water | | q.s. 200 L |

EXAMPLE 8

| Ingredient | Function | Quantity (kg) |
|---|---|---|
| Pthalo Green Pigment | Pigment | 20 kg |
| Calcium Carbonate | Extender | 50 kg |
| Orotan 1124 (Rohm & Haas) Functionalised polyacrylate copolymer (Anionic Dispersant) | Dispersant | 4 kg |
| Surfynol CT-171 (Air Products & Chemicals Inc) Anionic Dispersant | Dispersant | 4 kg |
| Acronal 290D (BASF) Styrene/acrylic copolymer dispersion | Binder | 80 kg |
| Texanol (Eastman Chemical Co) Ester alcohol | Coalescent | 2 kg |
| Acrysol DR72 (Rohm & Haas) Alkali Swellable Rheology Modifier | Rheology Modifier | 2 kg |
| Acrysol ASE 60 (Rohm & Haas) Acrylic polymer containing carboxylic acid groups (Alkali Swellable Thickener) | Thickener | 10 kg |
| Polyphobe TR117 (Union Carbide) | Thickener | 1 kg |
| Joncryl 142 (Johnson Wax Co) Alkali Soluble Ink Polymer | Auxiliary Binder | 10 kg |
| AMP or MEA to pH 9.3 | Neutraliser | |
| Water | | q.s. 200 L |

Compositions were prepared according to examples 1 to 8 and used under studio conditions and outdoors to prepare artworks on conventional substrates using conventional palettes and brushes. It was found that "wet in wet" painting techniques could be exercised for a full day and in some portions of the artworks on a second day, provided that water sprays were used.

KEY TO EXAMPLES 9-31

| Ingredient | Manufacturer | Quantity (kg) |
|---|---|---|
| Surfynol CT-171 (anionic dispersant) | Air Products & Chemicals Inc | Dispersant |
| Orotan 1124 (anionic dispersant) | Rohm & Haas | Dispersant |
| Mergal K10N | Troy Corporation | Biocide |
| Polyphase AF3 | Troy Corporation | Fungicide |
| Foamaster NS-1 | Henkel | Defoamer |
| Propylene glycol | Shell Petroleum | Freeze/thaw stability |

-continued

| Ingredient | Manufacturer | Quantity (kg) |
|---|---|---|
| AMP-95 | Dow Chemicals | Neutraliser |
| Primal SF-017 Water dispersible acrylic polymer | Rohm & Haas | Binder |
| Acrysol TT-615 (alkali swellable rheology modifier) | Rohm & Haas | Rheology modifier |
| Acrysol DR-1 (alkali swellable rheology modifier) | Rohm & Haas | Rheology modifier |
| Viscalex HV-30 | Ciba Specialty Chemicals | Thickener |
| Acrysol I-62 (alkali soluble polymer) | Rohm & Haas | Auxiliary binder |
| Omycarb-2 (calcium carbonate) | Omya-Southern Chemicals | Extender |
| Envirogen AD Surfactant | Air Products & Chemicals Inc | Non-foaming wetting agent |

EXAMPLE 9

| Ingredient | Quantity (kg) |
|---|---|
| Surfynol CT-171 | 1 |
| Orotan 1124 | 1.5 |
| Propylene Glycol | 6 |
| Mergal K10N | 0.3 |
| Polyphase AF3 | 0.3 |
| Foamaster NS-1 | 0.5 |
| AMP-95 | 4 |
| Primal SF-017 | 85 |
| Acrysol TT-615 | 1 |
| Acrysol DR-1 | 1 |
| Viscalex HV-30 | 8 |
| Acrysol I-62 | 10 |
| Pigment: Merlin Super Copper | 50 |
| Water | q.s. 200 L |

EXAMPLE 10

| Ingredient | Quantity (kg) |
|---|---|
| Surfynol CT-171 | 2 |
| Orotan 1124 | 3 |
| Propylene Glycol | 6 |
| Mergal K10N | 0.3 |
| Polyphase AF3 | 0.3 |
| Foamaster NS-1 | 0.5 |
| AMP-95 | 5 |
| Primal SF-017 | 85 |
| Acrysol TT-615 | 1 |
| Acrysol DR-1 | 1 |
| Viscalex HV-30 | 10 |
| Acrysol I-62 | 10 |
| Pigment: Shepherd Green 260 | 100 |
| Water | q.s. 200 L |

EXAMPLE 11

| Ingredient | Quantity (kg) |
|---|---|
| Surfynol CT-171 | 0.5 |
| Orotan 1124 | 1.5 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 5 |
| Primal SF-017 | 85 |
| Acrysol TT-615 | 1 |
| Acrysol DR-1 | 1 |
| Viscalex HV-30 | 12 |
| Acrysol I-62 | 10 |
| Pigment: Red 3705 | 50 |
| Water | q.s. 200 L |

EXAMPLE 12

| Ingredient | Quantity (kg) |
|---|---|
| Surfynol CT-171 | 0.5 |
| Orotan 1124 | 1.5 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 5 |
| Primal SF-017 | 85 |
| Acrysol TT-615 | 1 |
| Acrysol DR-1 | 1 |
| Viscalex HV-30 | 12 |
| Acrysol I-62 | 10 |
| Pigment: Pink 304/80 | 17.5 |
| Pigment: Red HFT | 20 |
| Water | q.s. 200 L |

EXAMPLE 13

| Ingredient | Quantity (kg) |
| --- | --- |
| Surfynol CT-171 | 0.5 |
| Orotan 1124 | 1.5 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 5 |
| Primal SF-017 | 85 |
| Acrysol TT-615 | 1 |
| Acrysol DR-1 | 1 |
| Viscalex HV-30 | 12 |
| Acrysol I-62 | 10 |
| Pigment: RCL 595 | 36 |
| Pigment: Pink 304/80 | 30 |
| Water | q.s. 200 L |

EXAMPLE 14

| Ingredient | Quantity (kg) |
| --- | --- |
| Surfynol CT-171 | 0.5 |
| Orotan 1124 | 1.5 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 4 |
| Primal SF-017 | 85 |
| Acrysol TT-615 | 1 |
| Acrysol DR-1 | 1 |
| Viscalex HV-30 | 8 |
| Acrysol I-62 | 10 |
| Pigment: RCL 595 | 36 |
| Pigment: Violet C10 | 6.2 |
| Water | q.s. 200 L |

EXAMPLE 15

| Ingredient | Quantity (kg) |
| --- | --- |
| Surfynol CT-171 | 0.5 |
| Orotan 1124 | 1.5 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 5 |
| Primal SF-017 | 85 |
| Acrysol TT-615 | 1 |
| Acrysol DR-1 | 1 |
| Viscalex HV-30 | 11 |
| Acrysol I-62 | 10 |
| Pigment: Red Fble | 60 |
| Water | q.s. 200 L |

EXAMPLE 16

| Ingredient | Quantity (kg) |
| --- | --- |
| Surfynol CT-171 | 0.25 |
| Orotan 1124 | 0.75 |
| Propylene Glycol | 6 |
| Mergal K10N | 0.3 |
| Polyphase AF3 | 0.3 |
| Foamaster NS-1 | 0.5 |
| Omyacarb-2 | 25 |
| AMP-95 | 5 |
| Primal SF-017 | 85 |
| Acrysol TT-615 | 1 |
| Acrysol DR-1 | 1 |
| Viscalex HV-30 | 10 |
| Acrysol I-62 | 10 |
| Pigment: RCL 595 | 60 |
| Pigment: Blue 2gax | 6.5 |
| Pigment: Green 1211/79 | 10.5 |
| Water | q.s. 200 L |

EXAMPLE 17

| Ingredient | Quantity (kg) |
| --- | --- |
| Surfynol CT-171 | 0.5 |
| Orotan 1124 | 1.5 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 5 |
| Primal SF-017 | 85 |
| Acrysol TT-615 | 1 |
| Acrysol DR-1 | 1 |
| Viscalex HV-30 | 10 |
| Acrysol I-62 | 10 |
| Pigment: RCL 595 | 75 |
| Pigment: Yellow 1811/82 | 2 |
| Pigment: Yellow C16 | 10 |
| Water | q.s. 200 L |

EXAMPLE 18

| Ingredient | Quantity (kg) |
| --- | --- |
| Surfynol CT-171 | 1.5 |
| Orotan 1124 | 2.25 |
| Propylene Glycol | 6 |
| Mergal K10N | 0.3 |
| Polyphase AF3 | 0.3 |
| Foamaster NS-1 | 0.5 |
| AMP-95 | 4 |
| Primal SF-017 | 85 |
| Acrysol TT-615 | 1 |
| Acrysol DR-1 | 1 |
| Viscalex HV-30 | 11 |
| Acrysol I-62 | 10 |
| Pigment: Black Oxide 318 | 70 |
| Water | q.s. 200 L |

EXAMPLE 19

| Ingredient | Quantity (kg) |
| --- | --- |
| Surfynol CT-171 | 0.25 |
| Orotan 1124 | 0.75 |
| Propylene Glycol | 6 |
| Mergal K10N | 0.3 |
| Polyphase AF3 | 0.3 |
| Foamaster NS-1 | 0.5 |
| Omyacarb-2 | 25 |
| AMP-95 | 4 |
| Primal SF-017 | 85 |
| Acrysol TT-615 | 1 |
| Acrysol DR-1 | 1 |
| Viscalex HV-30 | 8 |
| Acrysol I-62 | 10 |
| Pigment: RCL 595 | 150 |
| Water | q.s. 200 L |

EXAMPLE 20

| Ingredient | Quantity (kg) |
| --- | --- |
| Surfynol CT-171 | 1.5 |
| Orotan 1124 | 2.25 |
| Propylene Glycol | 6 |
| Mergal K10N | 0.3 |
| Polyphase AF3 | 0.3 |
| Foamaster NS-1 | 0.5 |
| amp-95 | 4.5 |
| Primal SF-017 | 85 |
| Acrysol TT-615 | 1 |
| Acrysol DR-1 | 1 |
| Viscalex HV-30 | 10 |
| Acrysol I-62 | 10 |
| Pigment: RS 210 | 68 |
| Water | q.s. 200 L |

Examples 21-31 exemplify paint compositions of the invention that are more like a traditional gouache.

EXAMPLE 21

| Absolute matte: ultramarine blue | |
| --- | --- |
| Ingredient | Quantity (kg) |
| Surfynol CT-171 | 5.5 |
| Orotan 1124 | 2.25 |
| Propylene glycol | 12 |
| Mergal K10N | 0.2 |
| Foamaster NS-1 | 0.5 |
| Envirogen ad surfactant | 0.2 |
| AMP-95 | 4 |
| Primal SF-017 | 40 |
| Acrysol TT-615 | 1 |
| Acrysol DR-1 | 1 |
| Viscalex HV-30 | 8 |
| Acrysol I-62 | 10.5 |
| Pigment: ultra blue premier RX | 75 |
| Water | q.s. 200 L |

EXAMPLE 22

| Absolute matte: napthol red light | |
| --- | --- |
| Ingredient | Quantity (kg) |
| Surfynol CT-171 | 4.4 |
| Orotan 1124 | 1.2 |
| Propylene glycol | 12 |
| Mergal K10N | 0.2 |
| Foamaster NS-1 | 0.5 |
| Envirogen AD surfactant | 0.2 |
| Omyacarb 2 | 60 |
| AMP-95 | 4 |
| Primal SF-017 | 40 |
| Acrysol TT-615 | 1 |
| Acrysol DR-1 | 1 |
| Viscalex HV-30 | 6 |
| Acrysol I-62 | 10 |
| Pigment: red frll | 50 |
| Water | q.s. 200 L |

EXAMPLE 23

| Absolute matte: cobalt turquoise light | |
| --- | --- |
| Ingredient | Quantity (kg) |
| Surfynol CT-171 | 6 |
| Orotan 1124 | 3 |
| Propylene glycol | 12 |
| Mergal K10N | 0.2 |
| Foamaster NS-1 | 0.5 |
| Envirogen AD surfactant | 0.2 |
| AMP-95 | 4 |
| Primal SF-017 | 40 |
| Acrysol TT-615 | 1 |
| Acrysol DR-1 | 1 |
| Viscalex HV-30 | 8 |
| Acrysol I-62 | 9 |
| Pigment: irgacolor turquoise 22-5500p | 100 |
| Water | q.s. 200 L |

EXAMPLE 24

| Absolute matte: titanium white | |
| --- | --- |
| Ingredient | Quantity (kg) |
| Surfynol CT-171 | 4.4 |
| Orotan 1124 | 1.2 |
| Propylene glycol | 12 |
| Mergal K10N | 0.2 |
| Foamaster NS-1 | 0.5 |
| Envirogen AD surfactant | 0.2 |
| Omyacarb 2 | 60 |
| AMP-95 | 4 |
| Primal SF-017 | 40 |
| Acrysol TT-615 | 1 |
| Acrysol ACRYSOL DR-1 | 1 |
| Viscalex HV-30 | 8 |
| Acrysol I-62 | 10 |
| Pigment: RCL 595 | 150 |
| Water | q.s. 200 L |

EXAMPLE 25

| Absolute matte: chromium green oxide | |
|---|---|
| Ingredient | Quantity (kg) |
| Surfynol CT-171 | 5.8 |
| Orotan 1124 | 3.6 |
| Propylene glycol | 12 |
| Mergal K10N | 0.2 |
| Foamaster NS-1 | 0.5 |
| Envirogen AD surfactant | 0.2 |
| Omyacarb 2 | 40 |
| AMP-95 | 4 |
| Primal SF-017 | 40 |
| Acrysol TT-615 | 1 |
| Acrysol ACRYSOL DR-1 | 1 |
| Viscalex HV-30 | 8 |
| Acrysol I-62 | 10 |
| Pigment: green oxide g6099 | 80 |
| Water | q.s. 200 L |

EXAMPLE 26

| Absolute matte: pthalo blue (red shade) | |
|---|---|
| Ingredient | Quantity (kg) |
| Surfynol CT-171 | 4.5 |
| Orotan 1124 | 1.2 |
| Propylene glycol | 12 |
| Mergal K10N | 0.2 |
| Foamaster NS-1 | 0.5 |
| Envirogen AD surfactant | 0.2 |
| Omyacarb 2 | 70 |
| AMP-95 | 4 |
| Primal SF-017 | 45 |
| Acrysol TT-615 | 1 |
| Acrysol DR-1 | 1 |
| Viscalex HAV-30 | 6 |
| Acrysol I-62 | 10 |
| Pigment: blue 303/81 | 30 |
| Water | q.s. 200 L |

EXAMPLE 27

| Absolute matte: pthalo green | |
|---|---|
| Ingredient | Quantity (kg) |
| Surfynol CT-171 | 4.5 |
| Orotan 1124 | 1.5 |
| Propylene glycol | 12 |
| Mergal K10N | 0.2 |
| Foamaster NS-1 | 0.5 |
| Envirogen AD surfactant | 0.2 |
| Omyacarb 2 | 70 |
| AMP-95 | 4 |
| Primal SF-017 | 40 |
| Acrysol TT-615 | 1 |
| Acrysol DR-1 | 1 |
| Viscalex HV-30 | 6 |
| Acrysol I-62 | 10 |
| Pigment: green 1211/79 | 30 |
| Water | q.s. 200 L |

EXAMPLE 28

| Absolute matte: burnt umber | |
|---|---|
| Ingredient | Quantity (kg) |
| Surfynol CT-171 | 5.6 |
| Orotan 1124 | 2.4 |
| Propylene glycol | 12 |
| Mergal K10N | 0.2 |
| Foamaster NS-1 | 0.5 |
| Envirogen AD surfactant | 0.2 |
| AMP-95 | 4 |
| Primal SF-017 | 40 |
| Acrysol TT-615 | 1 |
| Acrysol DR-1 | 1 |
| Viscalex HV-30 | 6 |
| Acrysol I-62 | 8 |
| Pigment: BU 524 | 80 |
| Water | q.s. 200 L |

EXAMPLE 29

| Absolute matte: carbon black | |
|---|---|
| Ingredient | Quantity (kg) |
| Surfynol CT-171 | 4.3 |
| Orotan 1124 | 0.9 |
| Propylene glycol | 12 |
| Mergal K10N | 0.2 |
| Foamaster NS-1 | 0.5 |
| Envirogen AD surfactant | 0.2 |
| Omyacarb 2 | 50 |
| AMP-95 | 4 |
| Primal SF-017 | 40 |
| Acrysol TT-615 | 1 |
| Acrysol DR-1 | 1 |
| Viscalex HV-30 | 6 |
| Acrysol I-62 | 6.6 |
| Pigment: black 43/77vb | 30 |
| Water | q.s. 200 L |

EXAMPLE 30

| Absolute matte: burnt sienna | |
|---|---|
| Ingredient | Quantity (kg) |
| Surfynol CT-171 | 5.6 |
| Orotan 1124 | 2.4 |
| Propylene glycol | 12 |
| Mergal K10N | 0.2 |
| Foamaster NS-1 | 0.5 |
| Envirogen AD surfactant | 0.2 |
| AMP-95 | 4 |
| Primal SF-017 | 40 |
| Acrysol TT-615 | 1 |
| Acrysol DR-1 | 1 |
| Viscalex HV-30 | 7 |
| Acrysol I-62 | 10 |
| Pigment: BS 310 | 80 |
| Water | q.s. 200 L |

EXAMPLE 31

| Absolute matte: cobalt blue hue | |
|---|---|
| Ingredient | Quantity (kg) |
| Surfynol CT-171 | 4.5 |
| Orotan 1124 | 1.5 |
| Propylene glycol | 12 |
| Mergal K10N | 0.2 |
| Foamaster NS-1 | 0.5 |
| Envirogen AD surfactant | 0.2 |
| Omyacarb 2 | 70 |
| AMP-95 | 4 |
| Primal SF-017 | 45 |
| Acrysol TT-615 | 1 |
| Acrysol DR-1 | 1 |
| Viscalex HV-30 | 8 |
| Acrysol I-62 | 11.5 |
| Pigment: RCL 595 | 9 |
| Water | q.s. 200 L |

The present invention gives an artist considerably more time to develop an artistic piece while still retaining the benefits of using water-based acrylic paints (such as low amounts of volatile organic compounds, excellent colour retention and brushes being able to be washed out in water). The invention provides paint compositions with increased open time without loss of appropriate viscosity and with desirable final film properties once the amine has evaporated.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A water-based artists' paint composition consisting essentially of:
    at least one pigment in an effective amount to provide the desired pigmentation;
    at least one alkali soluble polymer in an amount effective to increase the open time of the composition so that the paint composition remains workable and may be blended and altered for several hours and for as long as a day, said polymer being selected from polymers soluble at ambient temperature and pressure in an aqueous solution having a pH of from about 7 to 11;
    at least one substituted amine in an amount effective to adjust the pH to about 7 to 11, said amine selected from $C_{1-6}$ alcohol amines, $C_{1-6}$ alkyl $C_{1-6}$ alcohol amines and mixtures thereof;
    a binding effective amount of at least one water dispersible acrylic polymer; and
    an effective amount of at least one alkali soluble or alkali swellable thickener.

2. A paint composition according to claim 1 wherein the at least one alkali soluble polymer is soluble at ambient temperature and pressure in an aqueous solution having a pH of from about 7.5 to 10.

3. A paint composition according to claim 1 wherein the at least one alkali soluble polymer is soluble at ambient temperature and pressure in an aqueous solution having a pH of from about 7.5 to 9.5.

4. A paint composition according to claim 1 wherein the at least one substituted amine is in an amount effective to adjust the pH to about 7.5 to 10.

5. A paint composition according to claim 1 wherein the at least one substituted amine is in an amount effective to adjust the pH to about 7.5 to 9.5.

6. A paint composition according to claim 1 wherein the weight ratio of alkali soluble polymer to water dispersible acrylic polymer is in the range from about 1:4 to 1:20.

7. A paint composition according to claim 1 wherein the weight ratio of alkali soluble polymer to water dispersible acrylic polymer is about 1:5 to 1:10.

8. A paint composition according to claim 1 wherein the weight ratio of alkali soluble polymer to water dispersible acrylic polymer is about 1:5.33 to 1:10.

9. A paint composition according to claim 1 wherein the weight ratio of alkali soluble polymer to water dispersible acrylic polymer is about 1:6.66 to 1:10.

10. A paint composition according to claim 1 wherein the weight ratio of alkali soluble polymer to water dispersible acrylic polymer is about 1:8 to 1:10.

11. A paint composition according to claim 1 wherein the weight ratio of alkali soluble polymer to water dispersible acrylic polymer is about 1:1 to 1:3.

12. A paint composition according to claim 1 wherein the weight ratio of alkali soluble polymer to water dispersible acrylic polymer is about 3:4.

13. A paint composition according to claim 1 wherein the composition further comprises one or more dispersants, rheology modifiers, defoamers, coalescents or preservatives or mixtures thereof.

14. A paint composition according to claim 1 wherein the at least one substituted amine is selected from aminomethylpropanol (AMP), monoethanolamine (MEA), diethanolamine (DEA) and triethanolamine (TEA) and mixtures thereof.

15. A paint composition according to claim 1 wherein the at least one substituted amine is selected from AMP, TEA and mixtures thereof.

16. A process of making a water-based artists' paint composition consisting essentially of at least one alkali soluble polymer, at least one substituted amine, at least one water dispersible acrylic polymer, and at least one alkali soluble or alkali swellable thickener, the process comprising adding the at least one alkali soluble polymer in an effective amount to increase the open time of the composition so that the paint composition remains workable and may be blended or altered for several hours and for as long as a day, said polymer being selected from polymers soluble at ambient temperature and pressure in an aqueous solution having a pH of about 7 to 11; and
    at least one substituted amine in an amount effective to adjust the pH to about 7 to 11, said amine selected from $C_{1-6}$ alcohol amines, $C_{1-6}$ alkyl $C_{1-6}$ alcohol amines and mixtures thereof;
    a binding effective amount of at least one water dispersible acrylic polymer; and
    an effective amount of at least one alkali soluble or alkali swellable thickener.

17. The process according to claim 16 further comprising adding at least one pigment in an effective amount to provide a selected pigmentation.

18. The process according to claim 16 further comprising adding one or more dispersants, rheological modifiers, defoamers, coalescents or preservatives and mixtures thereof.

19. The process according to claim 16 wherein the at least one alkali soluble polymer is selected from polymers soluble at ambient temperature and pressure in an aqueous solution having a pH of about 7.5 to 10.

20. The process according to claim 16 wherein the at least one alkali soluble polymer is selected from polymers soluble at ambient temperature and pressure in an aqueous solution having a pH of about 7.5 to 9.5.

21. The process according to claim 16 wherein the wherein the weight ratio of alkali soluble polymer to water dispersible acrylic polymer is about 1:4 to 1:20.

22. The process according to claim 16 wherein the weight ratio of alkali soluble polymer to water dispersible acrylic polymer is about 1:5 to 1:10.

23. The process according to claim 16 wherein the weight ratio of alkali soluble polymer to water dispersible acrylic polymer is about 1:5.33 to 1:10.

24. The process according to claim 16 wherein the weight ratio of alkali soluble polymer to water dispersible acrylic polymer is about 1:6.66 to 1:10.

25. The process according to claim 16 wherein the weight ratio of alkali soluble polymer to water dispersible acrylic polymer is about 1:8 to 1:10.

26. The process according to claim 16 wherein the weight ratio of alkali soluble polymer to water dispersible acrylic polymer is about 1:1 to 1:3.

27. The process according to claim 16 wherein the weight ratio of alkali soluble polymer to water dispersible acrylic polymer is about 3:4.

28. The process according to claim 16 wherein the at least one substituted amine is selected from aminomethylpropanol (AMP), monoethanolamine (MEA), diethanolamine (DEA) and triethanolamine (TEA) and mixtures thereof.

29. A method of extending the open time of a conventional water-based acrylic artists' paint composition not including an alkali soluble polymer, the method consisting essentially of including in the conventional composition at least one alkali soluble polymer in an amount effective to increase the open time of the composition so that the paint composition remains workable and may be blended and altered for several hours and for as long as a day, said polymer being selected from polymers soluble at ambient temperature and pressure in an aqueous solution having a pH of about 7 to about 11; and at least one substituted amine selected from $C_{1-6}$ alcohol amines, $C_{1-6}$ alkyl $C_{1-6}$ alcohol amines and mixtures thereof in an amount effective to adjust the pH to about 7 to about 11.

30. A method of controlling the open time of a water-based acrylic artists' paint composition consisting essentially of at least one alkali soluble polymer in an amount effective to increase the open time of the composition so that the paint composition remains workable and may be blended and altered for several hours and for as long as a day, and at least one substituted amine selected from $C_{1-6}$ alcohol amines, $C_{1-6}$ alkyl $C_{1-6}$ alcohol amines and mixtures thereof in an amount effective to adjust the pH to about 7 to about 11, the method comprising periodically applying to the composition one or more of:
(a) water;
(b) a first medium comprising at least one alkali soluble polymer and at least one substituted amine selected from $C_{1-6}$ alcohol amines, $C_{1-6}$ alkyl $C_{1-6}$ alcohol amines and mixtures thereof in an amount effective to adjust the pH to about 7to about 11; and
(c) a second medium comprising at least one water dispersible acrylic polymer.

* * * * *